(12) United States Patent
Coates et al.

(10) Patent No.: US 10,490,848 B2
(45) Date of Patent: Nov. 26, 2019

(54) SOLID POLYMER ELECTROLYTE COMPOSITION

(71) Applicant: CORNELL UNIVERSITY, Ithaca, NY (US)

(72) Inventors: Geoffrey W. Coates, Lansing, NY (US); Rachna Khurana, Woodbury, MN (US)

(73) Assignee: CORNELL UNIVERSITY, Ithaca, NY (US)

( * ) Notice: Subject to any disclaimer, the term of this patent is extended or adjusted under 35 U.S.C. 154(b) by 617 days.

(21) Appl. No.: 15/030,173

(22) PCT Filed: Oct. 20, 2014

(86) PCT No.: PCT/US2014/061361
§ 371 (c)(1),
(2) Date: Apr. 18, 2016

(87) PCT Pub. No.: WO2015/058187
PCT Pub. Date: Apr. 23, 2015

(65) Prior Publication Data
US 2016/0276706 A1 Sep. 22, 2016

Related U.S. Application Data

(60) Provisional application No. 61/892,524, filed on Oct. 18, 2013.

(51) Int. Cl.
| | |
|---|---|
| *H01M 10/0565* | (2010.01) |
| *H01M 10/0525* | (2010.01) |
| *C08G 65/00* | (2006.01) |
| *C08J 5/22* | (2006.01) |
| *H01M 10/052* | (2010.01) |
| *C08F 290/06* | (2006.01) |
| *C08G 65/26* | (2006.01) |
| *C08G 65/329* | (2006.01) |
| *C08G 65/331* | (2006.01) |
| *C08G 65/337* | (2006.01) |
| *C08L 71/02* | (2006.01) |

(52) U.S. Cl.
CPC ..... *H01M 10/0565* (2013.01); *C08F 290/062* (2013.01); *C08G 65/002* (2013.01); *C08G 65/2609* (2013.01); *C08G 65/329* (2013.01); *C08G 65/331* (2013.01); *C08G 65/337* (2013.01); *C08J 5/2256* (2013.01); *C08L 71/02* (2013.01); *H01M 10/052* (2013.01); *H01M 10/0525* (2013.01); *C08J 2371/02* (2013.01); *C08L 2205/02* (2013.01); *H01M 2300/0082* (2013.01); *Y02T 10/7011* (2013.01)

(58) Field of Classification Search
CPC ......... H01M 10/0562; H01M 10/0565; H01M 10/0525
See application file for complete search history.

(56) References Cited

U.S. PATENT DOCUMENTS

| | | | |
|---|---|---|---|
| 6,465,135 B1 | 10/2002 | Nishimura et al. | |
| 7,598,313 B2 | 10/2009 | Emrick et al. | |
| 2003/0134968 A1* | 7/2003 | Kang | C08F 230/08 524/588 |
| 2009/0162754 A1 | 6/2009 | Cotton et al. | |
| 2010/0255383 A1 | 10/2010 | Kofinas | |
| 2011/0281175 A1 | 11/2011 | Hudson et al. | |
| 2013/0189590 A1 | 7/2013 | Jean-Marc et al. | |
| 2013/0260259 A1* | 10/2013 | Zhong | H01M 8/1025 429/317 |
| 2014/0178775 A1 | 6/2014 | Lee et al. | |

FOREIGN PATENT DOCUMENTS

| | | |
|---|---|---|
| CN | 1280149 A | 1/2001 |
| CN | 102496736 A | 6/2012 |
| JP | 07109321 A | 4/1995 |
| KR | 1020070077977 A | 7/2007 |
| WO | 2013033126 A1 | 3/2013 |

OTHER PUBLICATIONS

International Search Report and Written Opinion for PCT/US2014/061361, dated Jan. 22, 2015.
Guilherme, L.A. et al; "Ionic conductivity in polyethylene-b-poly(ethylene oxide/lithium perchlorate solid polymer electrolytes," Electrochimica Acta, Apr. 7, 2007, pp. 1503-1511, vol. 53, No. 4.
Gurevitch, Inna et al; "Nanocomposites of Titanium Dioxide and Polystyrene-Poly(ethylene oxide) Block Copolymer as Solid-State Electrolytes for Lithium Metal Batteries," Journal of the Electrochemical Society, Jul. 23, 2013, pp. A1611-A1617, vol. 160, No. 9.
Jannasch, Patric; "Ionic conductivity in physical networks of polyethylene-polyether polyethylene triblock copolymers," Chemistry of Materials, 2002, pp. 2718-2724, vol. 14, No. 6.
Lee, Yong Min et al., "Highly Ion-Conductive Solid Polymer Electrolytes Based on Polyethylene Non-Woven Matrix," Electrochimica Acta 52, Jun. 12, 2006, pp. 1582-1587.
Sinturel, Christophe et al., "Nanostructured Polymers Obtained from Polyethylene-block-poly(ethylene oxide) Block Copolymer in Unsaturated Polyester," Macromolecules, Jan. 22, 2007, pp. 2532-2538.

(Continued)

*Primary Examiner* — Bethany L Martin
(74) *Attorney, Agent, or Firm* — Heslin Rothenberg Farley & Mesiti P.C.

(57) ABSTRACT

A polymer electrolyte composition includes a hard polymer segment covalently bound to an ionically-conducting segment, and a salt that includes an element M selected from an alkali metal, an alkaline earth metal, zinc, and aluminum. The hard polymer segment has a glass transition temperature ($T_g$) greater than or equal to 110° C., or a melting temperature ($T_m$) greater than 110° C. The ionically-conducting segment has a molecular weight of 800 to 10,000 g/mol. The polymer electrolyte composition has an ionic conductivity for an M ion greater than or equal to $1\times10^{-8}$ S/cm at 25° C. Methods for the preparation of the polymer electrolyte composition are also provided, as are articles (e.g., electrochemical cells and energy storage devices) that contain the polymer electrolyte composition.

19 Claims, 2 Drawing Sheets

(56) References Cited

OTHER PUBLICATIONS

Liu, S. et al., "Lithium Dendrite Formation in Li/Poly(ethylene oxide)-Lithium Bis(trifluoromethanesulfonyl)imde and N-Methyl-N-propylpiperidinium Bis(trifluoromethanesulfonyl)imide/Li Cells," Journal of the Electrochemical Society, 157 (10), Aug. 25, 2010, pp. A1092-A1098.

Liu, S. et al., "Effect of Co-Doping Nano-Silica Filler and N-methyl-N-methyl-N-propylpiperidinium bis(trifluoromethanesulfonyl)imide Into Polymer Electrolyte on Li Dendrite Formation in Li/poly(ethylene oxide)-Li($CF_3SO_2$)$_2$N/Li," Journal of Power Sources, vol. 196, Apr. 20, 2011, pp. 7681-7686.

Hallinan, Daniel T. et al., "Lithium Metal Stability in Batteries with Block Copolymer Electrolytes," Journal of the Electrochemical Society, vol. 160 (3), Jan. 10, 2013, pp. A464-A470.

Lu, Yingying et al., "Stable Lithium Electrodeposition in Liquid and Nanoporous Solid Electrolytes," Nature Materials, vol. 13, Aug. 10, 2014, pp. 961-969.

Stone, G.M. et al., "Resolution of Modulus Versus Adhesion Dilemma in Solid Polymer Electrolytes for Rechargeable Lithium Metal Batteries," Journal of the Electrochemical Society, vol. 159 (3), Dec. 30, 2011, pp. A222-A227.

Gurevitch, Inna et al., Nanocomposites of Titanium Dioxide and Polystyrene-Poly(ethylene oxide) Block Copolymer as Solid-State Electrolytes for Lithium Metal Batteries, Journal of the Electrochemical Society, vol. 160 (9), Jul. 23, 2013, pp. A1611-A1617.

Khurana, Rachna et al., "Suppression of Lithium Dendrite Growth Using Cross-Linked Polyethylene/Poly(ethylene oxide) Electrolytes: A New Approach for Practical Lithium-Metal Polymer Batteries," Journal of the American Chemical Society, Apr. 22, 2014, pp. 7395-7402.

Singh, Mohit et al., "Effect of Molecular Weight on the Mechanical and Electrical Properties of Block Copolymer Electrolytes," Macromolecules, vol. 40, Mar. 23, 2007, pp. 4578-4585.

Jannasch, Patric, "Ionic Conductivity in Physical Networks of Polyethylene-Polyether-Polyethylene Triblock Copolymers," American Chemical Society, vol. 14, May 4, 2002, pp. 2718-2724.

\* cited by examiner

SOLID POLYMER ELECTROLYTE COMPOSITION

CROSS-REFERENCE TO RELATED APPLICATIONS

This application is a national stage filing under section 371 of International Application No. PCT/US2014/061361, filed on Oct. 20, 2014, and published in English on Apr. 23, 2015, as WO 2015/058187, and claims priority to U.S. Provisional Application No. 61/892,524, filed Oct. 18, 2013. The entire contents of each of the prior applications are incorporated herein by reference in their entirety.

GOVERNMENT RIGHTS STATEMENT

This invention was made with U.S. Government support under Grant Number DE-SC0001086 awarded by US Department of Energy. The United States Government has certain rights in the invention.

FIELD OF THE INVENTION

The present invention generally relates to polymer electrolyte compositions, to processes for the preparation of the compositions, and to articles comprising the compositions.

BACKGROUND OF THE INVENTION

Rechargeable batteries, such as lithium (Li)-ion batteries, are promising candidates for various applications, including, e.g., electric vehicle applications, due to their high energy density. However, the safety of such batteries is limited due to the use of flammable liquid electrolytes. Several incidents, including a 2013 fire in the Li-ion battery unit of a Boeing 787 Dreamliner airplane, have raised questions about the safety of using Li-ion batteries for transport applications. Furthermore, the specific energy density of current state-of-the-art Li-ion batteries is below the U.S. Department of Energy Vehicle Technologies Program's long-term target for secondary batteries. Replacing flammable electrolytes and enhancing the energy density of Li-based battery technologies are at the forefront of research in both academia and industry.

Solid polymer electrolytes (SPE's) are an alternative to liquid electrolytes due to their non-volatility, low toxicity, and high energy density. SPE's can be useful in, e.g., Li-metal based batteries and related electrochemical energy storage devices that require high ionic conductivity at ambient temperature (>10-4 S/cm at 25° C.) and suppression of lithium dendrite growth. Such dendrite growth can occur in other batteries, which can cause short circuiting/over-heating/thermal run-away.

A rechargeable Li-metal based battery is considered to a promising technology for energy storage due to its high storage capacity, due to the use of lithium (Li) metal, instead of lithiated graphite. However, its use with liquid electrolytes is currently limited by the formation of irregular Li electrodeposits (dendrites) during repeated charge-discharge cycles, which often lead to short circuit causing over-heating and thermal run-away.

Many approaches have been proposed in the literature to delay dendrite nucleation, including alloying Li anodes with other metals and using additives to improve the uniformity at the solid electrolyte interface (SEI), although performance suffers due to a reduced anode capacity and durability is reduced by consumption of additives as part of the SEI films during successive charge-discharge cycles.

One group proposed that solid polymer electrolytes (SPEs) with high shear modulus (G'>6 GPa) could be used to suppress the dendrite growth. Monroe, C.; Newman, J. *J Electrochem Soc* 2005, 152, A396. Subsequently, another group demonstrated resistance to Li dendrite growth formation using polystyrene-b-poly(ethylene oxide) (SEO) block copolymers, thereby supporting the high modulus theory. Stone, G. M.; Mullin, S. A.; Teran, A. A.; Hallinan, D. T., Jr.; Minor, A. M.; Hexemer, A.; Balsara, N. P. *J. Electrochem. Soc.* 2012, 159, A222. However, while the SEO polymer showed suppressed dendrite growth at the anode, its low ionic conductivities ($<10^{-4}$ S/cm at 25° C.) (Singh, M.; Odusanya, O.; Wilmes, G. M.; Eitouni, H. B.; Gomez, E. D.; Patel, A. J.; Chen, V. L.; Park, M. J.; Fragouli, P.; Iatrou, H.; Hadjichristidis, N.; Cookson, D.; Balsara, N. P. *Macromolecules* 2007, 40, 4578) limit its use to high temperature applications, which excludes room temperature and vehicular uses.

Thus, a need exists for an improved solid polymer electrolyte separator material that exhibits high ionic conductivity at room temperature and enhanced Li dendrite growth suppression.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

In this specification, where a document, act or item of knowledge is referred to or discussed, this reference or discussion is not an admission that the document, act or item of knowledge or any combination thereof was, at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

Briefly, the present invention satisfies the need for an improved polymer electrolyte compositions, and for articles (e.g., batteries) comprising the same. The present invention may address one or more of the problems and deficiencies of the art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

Certain embodiments of the presently-disclosed polymer electrolyte compositions and articles comprising and methods for making the same have several features, no single one of which is solely responsible for their desirable attributes. Without limiting the scope of these polymer electrolyte compositions, article, and methods as defined by the claims that follow, their more prominent features will now be discussed briefly. After considering this discussion, and particularly after reading the section of this specification entitled "Detailed Description of the Invention," one will understand how the features of the various embodiments disclosed herein provide a number of advantages over the current state of the art. These advantages may include, without limitation, providing an improved polymer electrolyte composition that allows for improved battery operation (e.g., due to improved dendrite growth resistance).

In one aspect, the invention provides a polymer electrolyte composition comprising:
  a hard polymer segment having:
    (a) a glass transition temperature (TO greater than or equal to 110° C.; or
    (b) a melting temperature (T.) greater than 110° C.;
  an ionically-conducting segment, said ionically-conducting segment having a molecular weight of 800 to 10,000 g/mol; and
  a salt comprising an element M, wherein M is selected from an alkali metal, an alkaline earth metal, zinc, and aluminum,
wherein the hard polymer segment is covalently bound to the ionically-conducting segment, and wherein said polymer electrolyte composition has an ionic conductivity for an M ion greater than or equal to $1\times10^{-8}$ S/cm at 25° C.

In a second aspect, the invention provides an electrochemical cell comprising the polymer electrolyte composition as described above with reference to the first aspect of the invention.

In a third aspect, the invention provides an energy storage device (e.g., a battery), comprising a plurality of electrochemical cells, wherein at least one of the plurality of electrochemical cells is an electrochemical cell according to the second aspect of the invention, as described above.

In a fourth aspect, the invention provides a method for the preparation of the polymer electrolyte composition according to the first aspect of the invention, and, accordingly, for methods of preparing articles comprising the polymer electrolyte composition, said method comprising:
  co-polymerizing a mixture comprising a compound comprising the hard polymer segment or a precursor thereof and a compound comprising the ionically-conducting segment or a precursor thereof in the presence of Grubbs second-generation catalyst, the salt, and solvent; and
  evaporating the solvent to obtain a polymer film.

These and other features and advantages of this invention will become apparent from the following detailed description of the various aspects of the invention taken in conjunction with the appended claims and the accompanying drawings.

BRIEF DESCRIPTION OF THE DRAWINGS

The present invention will hereinafter be described in conjunction with the following figures, wherein:

FIG. 2A provides galvanostatic cycling test data showing Ca as a function of current density at 90° C. for $(^{70}\text{PEOX}_{0.34})(^{34}\text{PE}_{0.35})$ $(^{5}\text{PEG}_{0.31})$ polymer electrolyte (●) and PEO 900 kDa (◆). The cells were cycled at constant current density with each half cycle of 3 h until a short circuit was observed. FIG. 2B provides galvanostatic polarization test data, namely, a plot of short circuit time ($t_{sc}$) as a function of current density for various $^{70}$PEOX polymer electrolyte composition embodiments having different weight percent (wt %) of the plasticizer (PEG275). A PEO 900 kDa sample is also shown for comparison purposes.

DETAILED DESCRIPTION OF THE INVENTION

Figure 1:
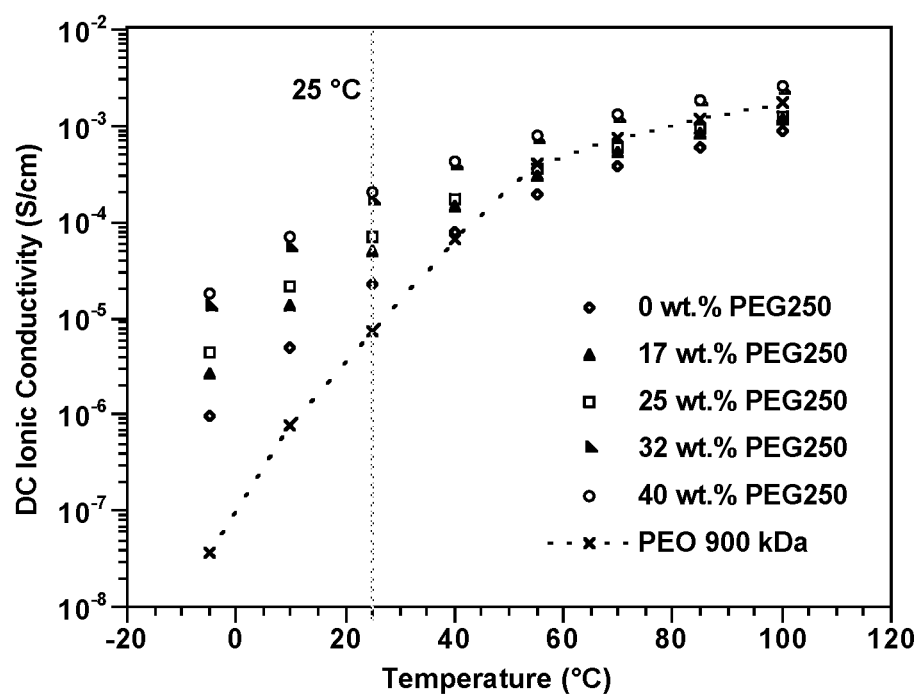
FIG. 1 depicts a plot of DC ionic conductivity as a function of temperature for $^{70}$PEOX polymer electrolyte composition embodiments having different weight percent of PEG275 plasticizer. All films had [COE]:[1] ratio of 15:1 and [EO]:[Li] composition of 18:1. The conductivity of a PEO 900 kDa sample with [EO]:[Li] ratio of 18:1 is also shown for comparison purposes.

Aspects of the present invention and certain features, advantages, and details thereof, are explained more fully below with reference to non-limiting embodiments of the invention. Descriptions of well-known materials, fabrication tools, processing techniques, etc., are omitted so as to not unnecessarily obscure the invention in detail. It should be understood, however, that the detailed description and the specific examples, while indicating embodiments of the invention, are given by way of illustration only, and are not by way of limitation. Various substitutions, modifications, additions and/or arrangements within the spirit and/or scope of the underlying inventive concepts will be apparent to those skilled in the art from this disclosure, and such embodiments fall within the scope of the invention as defined by the claims that follow.

In one aspect, the invention provides a polymer electrolyte composition comprising:
  a hard polymer segment having:
    (a) a glass transition temperature ($T_g$) greater than or equal to 110° C.; or
    (b) a melting temperature ($T_m$) greater than 110° C.;
  an ionically-conducting segment, said ionically-conducting segment having a molecular weight of 800 to 10,000 g/mol; and
  a salt comprising an element M, wherein M is selected from an alkali metal, an alkaline earth metal, zinc, and aluminum,
wherein the hard polymer segment is covalently bound to the ionically-conducting segment, and wherein said polymer electrolyte composition has an ionic conductivity for an M ion greater than or equal to $1\times10^{-8}$ S/cm at 25° C.

The hard polymer segment, which has at least one of a glass transition temperature ($T_g$) greater than or equal to 110° C. and a melting temperature ($T_m$) greater than 110° C., provides mechanical integrity to the polymer film.

In some embodiments, the hard polymer segment comprises a $C_{15}$ to $C_{80}$ alkyl group (i.e., an alkyl group having 15 to 80 carbon atoms, e.g., 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 carbon atoms), including any and all ranges and subranges therein (e.g., $C_{30}$-$C_{50}$, etc.). The hard polymer segment represents only a segment of the inventive polymer electrolyte composition. As persons having ordinary skill in the art would readily recognize, following polymerization, the polymer electrolyte composition typically comprises a plurality of hard polymer segments. For example, when a composition is prepared according to, e.g., Scheme 1 below, the entire PE backbone (which comprises PE units from both the independent cyclooctene COE and cyclooctene residue of PEOX1) represents a hard polymer portion (having many times more carbon units than the hard polymer segment described herein, e.g., in some embodiments, ~10,000 carbons), which comprises a plurality of hard polymer segments. In some embodiments (as illustrated, e.g., in Scheme 1), the hard polymer segment is a $C_{15}$ to $C_{80}$ alkyl group adjoining two ionically conducting segments.

In some embodiments, the hard polymer segment comprises units of a semicrystalline polymer selected from polyethylene (PE), polyethylene terephthalate (PET), polynorbornene, polydicyclopentadiene, poly(4-methyl-1-pentene), polytetrafluoroethylene (PTFE) and isotactic or syndiotactic polypropylene (PP). In a particular embodiment, the hard polymer segment comprises polyethylene.

In some embodiments the hard polymer segment comprises 10 to 40 repeating units of polyethylene, i.e., the hard polymer segment comprises a structural unit of the formula

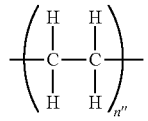

wherein n" is a number from 10 to 40 (e.g., 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40), including any and all ranges and subranges therein. In some embodiments, the polyethylene comprises 15 to 25 repeating polyethylene units (i.e., n"=15 to 25).

In some embodiments, the hard polymer segment has a glass transition temperature ($T_g$) from 110 to 400° C., or a melting temperature ($T_m$) from 110 to 400° C. (e.g., 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, or 400° C.), including any and all ranges therein. For example, in some embodiments, the hard polymer segment has a glass transition temperature ($T_g$) from 110 to 170° C., or a melting temperature ($T_m$) from 110 to 170° C.

The ionically-conducting segment comprises one or more structural units that show ionic conductivity when ionic salts are dissolved in them. The ionically-conducting segment is covalently bonded to the hard polymer segment.

The ionically-conducting segment has a molecular weight of 800 to 10,000 g/mol (e.g., 800, 900, 1000, 1250, 1500, 1750, 2000, 2250, 2500, 2750, 3000, 3250, 3500, 3750, 4000, 4250, 4500, 4750, 5000, 5250, 5500, 5750, 6000, 6250, 6500, 6750, 7000, 7250, 7500, 7750, 8000, 8250, 8500, 8750, 9000, 9250, 9500, 9750 or 10000 g/mol), including any and all ranges and subranges therein. For example, in some embodiments, the ionically-conducting segment has a molecular weight of 1,750 to 8,000 g/mol. In particular embodiments, the ionically-conducting segment has a molecular weight of 2,000 to 6,000 g/mol. In some embodiments, the ionically-conducting segment has a molecular weight of 2,500 to 4,000 g/mol.

The ionically-conducting segment contributes to the conductivity of the polymer electrolyte composition, which has an ionic conductivity for an M ion greater than or equal to $1\times10^{-8}$ S/cm at 25° C.

In some embodiments, the ionically-conducting segment comprises polyethylene oxide (PEO). In some embodiments, the ionically-conducting segment comprises 30 to 140 repeating polyethylene oxide units, i.e., the ionically-conducting segment comprises a structural unit of the formula

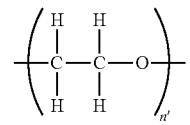

wherein n' is a number from 30 to 140 (e.g., 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, or 140), including any and all ranges and subranges therein. For example, in some embodiments, the ionically-conducting segment comprises 60 to 100 (i.e., n'=60 to 100) repeating polyethylene oxide units, or 70 to 90 repeating polyethylene oxide units (i.e., n'=70 to 90).

In some embodiments, the ionically-conducting segment further comprises a structural unit of formula —$(CH_2)_8$—.

In some embodiments, the ionically-conducting segment additionally comprises a benzene ring. In a particular such embodiment, the ionically-conducting segment comprises a structural unit having the formula:

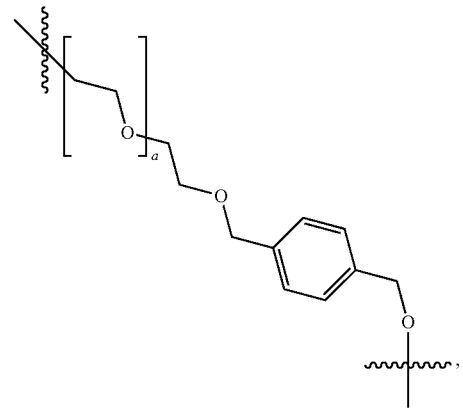

wherein a represents a number from 30 to 140 (e.g., 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, or 140), including any and all ranges and subranges therein (e.g., 40 to 130, 70 to 90, etc.).

In some embodiments, the polymer framework of the polymer electrolyte composition is crosslinked. In other embodiments, the polymer framework is non-crosslinked (e.g., block copolymers, multiblock copolymers, graft copolymers, etc.).

In various embodiments, the crystallization of the ionically conducting segment is suppressed by cross-linking the ionically conducting component. Accordingly, in some embodiments, the normally semicrystalline ion conducting material is made substantially amorphous via covalent or physical crosslinking.

In some embodiments, the ionically-conducting segment comprises a residue from a precursor compound of the formula (I):

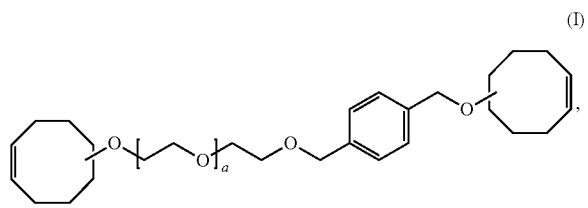

(I)

wherein a is defined as above.

Embodiments of the inventive polymer electrolyte composition that comprise residues of compounds that begin and end with cycloalkylene groups (as in the case of embodiments comprising a residue from a precursor compound of formula (I)), may be crosslinked. This is because compounds of formula (I) can serve as crosslinkers during polymerization.

In some embodiments, the inventive polymer electrolyte composition comprises a residue of a compound having a cycloalkylene groups at only one end of the compound. Such embodiments are less conducive to cross-linking.

The salt comprises an element M, wherein M is selected from an alkali metal, an alkaline earth metal, zinc (Zn), and aluminum (Al). In some embodiments, M is selected from an alkali metal and an alkaline earth metal. In particular embodiments, M is selected from lithium (Li), sodium (Na), and potassium (K). In one particular embodiment, M is lithium. In another particular embodiment, M is sodium.

In some embodiments, the salt is a lithium salt. In some embodiments, the salt is a binary lithium salt.

In some embodiments, the salt is selected from of lithium bis(trifluoromethanesulfonyl)imide (LiTF SI), lithium hexafluorophosphate ($LiPF_6$), lithium trifluoromethanesulfonate ($LiCF_3SO_3$), lithium perchlorate ($LiClO_4$), lithium tetrafluoroborate ($LiBF_4$), lithium hexafluoroarsenate ($LiAsF_6$), lithium bis(trifluoromethanesulfonimide) ($LiN(CF_3SO_2)_2$), lithium bis(perfluoroethylsulfonylimide) ($LiN(C_2F_5SO_2)_2$), lithium thiocyanate (LiSCN), lithium dicyanamide ($LiN(CN)_2$), lithium tris (trifluoromethanesulphonyl)methyl ($LiC(CF_3SO_2)_3$), lithium bisoxalatoborate ($LiB(C_2O_4)_2$), lithium oxalatoborates, lithium bis(chelato) borate, lithium alkyl fluorophosphates, $LiPF_3(C_2F_5)_3$, and $LiPF_3(CF_3)_3$. In a particular embodiment, the salt is LiTFSI.

In some embodiments, the inventive polymer electrolyte composition may optionally include a plasticizer, which may improve ionic conductivity and/or support higher charge/discharge rates.

In some embodiments, the plasticizer has a molecular weight of less than 2000 g/mol. For example, in some embodiments, the plasticizer has a molecular weight of 100 to 2000 g/mol (e.g., 100, 150, 200, 250, 300, 350, 400, 450, 500, 550, 600, 650, 700, 750, 800, 850, 900, 950, 1000, 1100, 1150, 1200, 1250, 1300, 1350, 1400, 1450, 1500, 1550, 1600, 1650, 1700, 1750, 1800, 1850, 1900, 1950, or 2000 g/mol), including any and all ranges and subranges therein (e.g., 100 to 1000 g/mol., 200 to 500 g/mol, etc.)

In some embodiments, the plasticizer comprises polyethylene glycol dimethyl ether (PEG). In a particular embodiment, the plasticizer comprises PEG of 250 molecular weight.

The inventive polymer electrolyte composition has an ionic conductivity for an M ion (i.e., an alkali metal ion, an alkaline earth metal ion, a zinc ion, or an aluminum ion) of greater than or equal to $1\times10^{-8}$ S/cm at 25° C. For example, in some embodiments, the inventive polymer electrolyte composition has an ionic conductivity for an M ion of greater than or equal to $1\times10^{-7}$, $5\times10^{-7}$, $1\times10^{-6}$, $2\times10^{-6}$, $4\times10^{-6}$, $6\times10^{-6}$, $8\times10^{-6}$, $9\times10^{-6}$, $1\times10^{-5}$, $2\times10^{-5}$, $3\times10^{-5}$, $4\times10^{-5}$, $5\times10^{-5}$, $6\times10^{-5}$, $7\times10^{-5}$, $8\times10^{-5}$, $9\times10^{-5}$, $1\times10^{-4}$, or $2\times10^{-4}$ S/cm at 25° C. In some embodiments, the polymer electrolyte composition has an ionic conductivity for an M ion between, e.g., $1\times10^{-5}$ and $2\times10^{-4}$ S/cm at 25° C., including any and all ranges and subranges therein.

In some embodiments, the polymer electrolyte composition has a dendrite growth resistance ($C_d$) value greater than or equal to 25 C/cm² at current density (J) value of 0.26 mA/cm² and 90° C. $C_d$ values for the galvanostatic cycling tests are calculated using the following equation:

$$C_d = t \times J$$

where, t is the short-circuit time measured in seconds, J is the current density value measured in A/cm² and $C_d$ is the dendrite growth (e.g., lithium dendrite growth) resistance measured in C/cm².

In some embodiments, the polymer electrolyte composition has a dendrite growth resistance ($C_d$) value of greater than or equal to 25, 50, 100, 110, 120, 130, 140, 150, 160, 170, 180, 190, 200, 220, 240, 260, 280, 300, 350, 400, 450, 500, 550, 600, 650, 700, 750, 800, 850, 900, 950, 1000, 1050, 1100, 1150, or 1200 C/cm² at current density (J) value of 0.26 mA/cm² and 90° C.

In some embodiments, the inventive polymer electrolyte composition is free of (i.e., does not include) a flammable organic solvent.

The total ionically-conducting material in the polymer electrolyte composition is significant enough to provide continuous pathways through the bulk material. For example, in some embodiments, the total ionically-conducting material (i.e., the sum of ionically-conducting segments) makes up 30% to 85% of the volume of the polymer electrolyte composition (e.g., 30, 35, 40, 45, 50, 55, 60, 65, 70, 75, 80, or 85%), including any and all ranges and subranges therein. In some embodiments, the total of hard polymer segments in the polymer electrolyte composition makes up 15 to 70% of the volume of the polymer electrolyte composition (e.g., 15, 20, 25, 30, 35, 40, 45, 50, 55, 60, 65, or 70%), including any and all ranges and subranges therein.

In a second aspect, the invention provides an electrochemical cell comprising the polymer electrolyte composition as described above with reference to the first aspect of the invention.

In a third aspect, the invention provides an energy storage device (e.g., a battery), comprising a plurality of electrochemical cells, wherein at least one of the plurality of electrochemical cells is an electrochemical cell according to the second aspect of the invention, as described above.

In a fourth aspect, the invention provides a method for the preparation of the polymer electrolyte composition according to the first aspect of the invention, and, accordingly, for methods of preparing articles comprising the polymer electrolyte composition, said method comprising:
co-polymerizing a mixture comprising a compound comprising the hard polymer segment or a precursor thereof and a compound comprising the ionically-conducting segment or a precursor thereof in the presence of Grubbs second-generation or third generation catalyst, the salt, and solvent; and
evaporating the solvent to obtain a polymer film.

In some embodiments, the method for the preparation of the polymer electrolyte composition additionally comprises solid state hydrogenation reaction of the polymer film in the presence of a lithium salt.

In some embodiments, the inventive method comprises:
co-polymerizing a mixture comprising a cycloalkylene compound and a compound comprising the ionically-conducting segment or a precursor thereof in the presence of Grubbs second-generation catalyst, the salt, and solvent;
evaporating the solvent to obtain a polymer film; and
solid state hydrogenation reaction of the polymer film in the presence of a lithium salt.

In some embodiments of the inventive method of preparing the polymer electrolyte composition, the solvent is tetrahydrofuran (THF).

In some embodiments of the inventive method of preparing the polymer electrolyte composition, the cycloalkylene compound is cyclooctene.

In some aspects and embodiments, the inventive polymer electrolyte composition is prepared by a method comprising at least one of: 1) Growth of a conducting polymer phase off a 'hard' backbone, with optional coupling of the chain ends to create a crosslinked polymer; 2) Growth of a 'hard' polymer phase off a conducting polymer backbone, with optional coupling of the chain ends to create a crosslinked polymer; 3) Reacting a multifunctional 'hard' polymer with a multi-functional conducting phase to create a crosslinked polymer; 4) Polymerization of a conducting macromonomer with another monomer that creates a 'hard' polymer backbone; 5) Polymerization of a 'hard' macromonomer with another monomer that creates a conducting polymer backbone.

Available non-limiting synthetic routes for preparing the inventive polymer electrolyte compositions include the following synthetic routes, which generally make reference to polymer electrolyte composition embodiments containing the formula $(^{a}PEOX_1)(^{b}PE_m)(^{c}PEG_n)$. In the following syntheses, a represents the average number of ethylene oxide (EO) units in PEOX crosslinker; b represents the average number of polyethylene (PE) units between crosslinks; c represents the average number of ethylene oxide (EO) units in the plasticizer; l represents $\chi_{PEOX}$=moles of EO units in PEOX/total moles of EO and PE units; m represents $\chi_{PE}$=moles of PE units in mainchain/total moles of EO and PE units; and n represents $\chi_{PEG}$=moles EO units in PEG/total moles of EO and PE units.

Persons having ordinary skill in the art will readily recognize possible substitutions and modifications within the following schemes, that fall within the scope of the present invention, and that can be used to prepare non-illustrated embodiments of the inventive polymer electrolyte compositions.

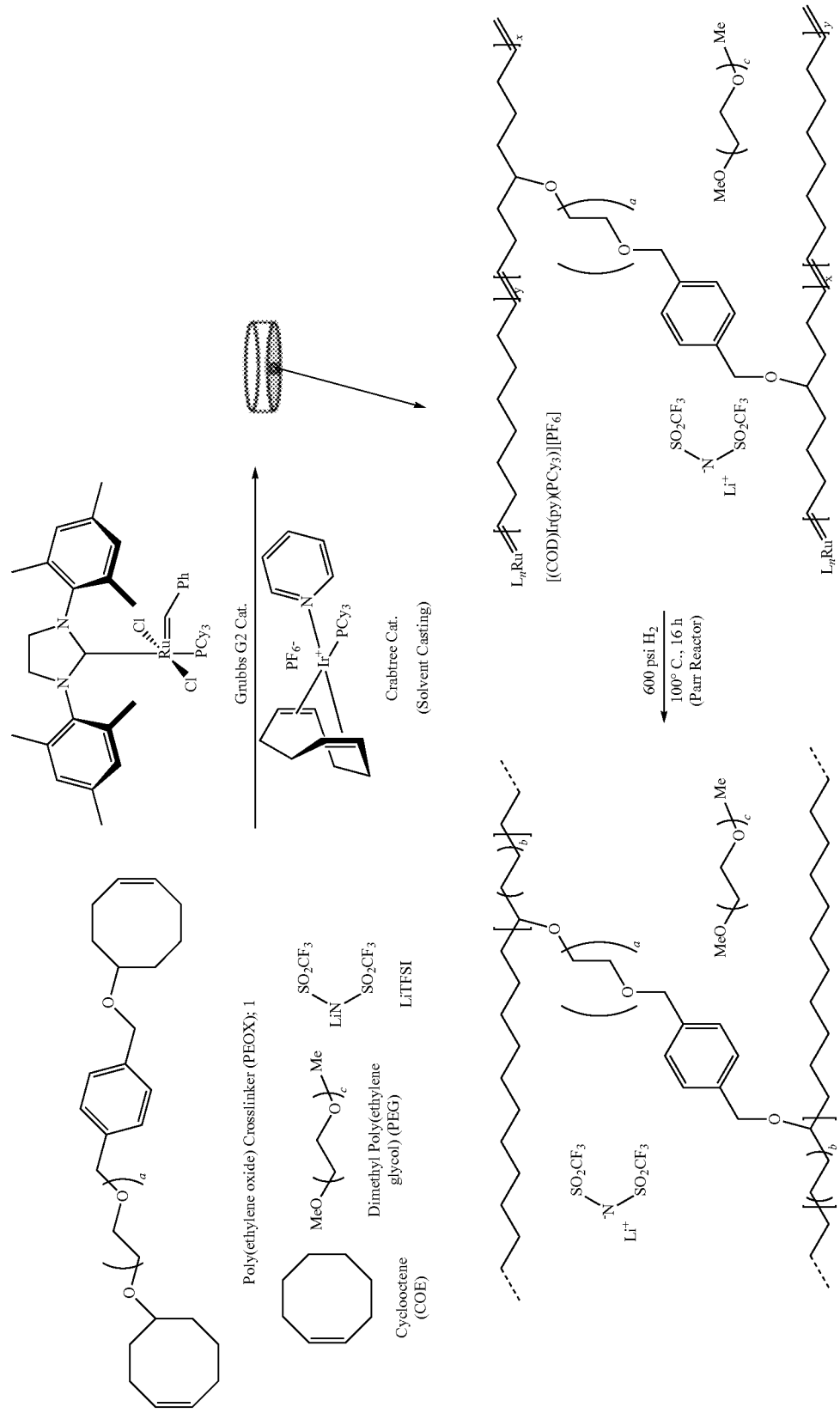

Scheme 2. Sample synthesis of non-crosslinked polymers
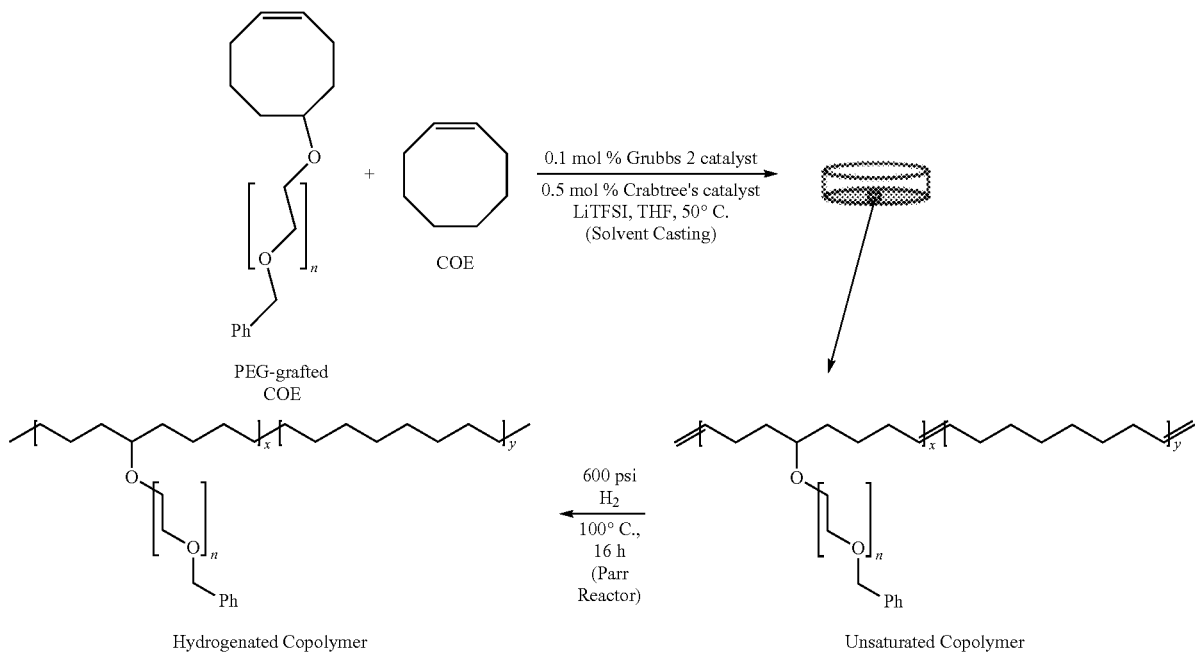
Scheme 3. Sample synthesis of PEO grafted cross-linked polymers
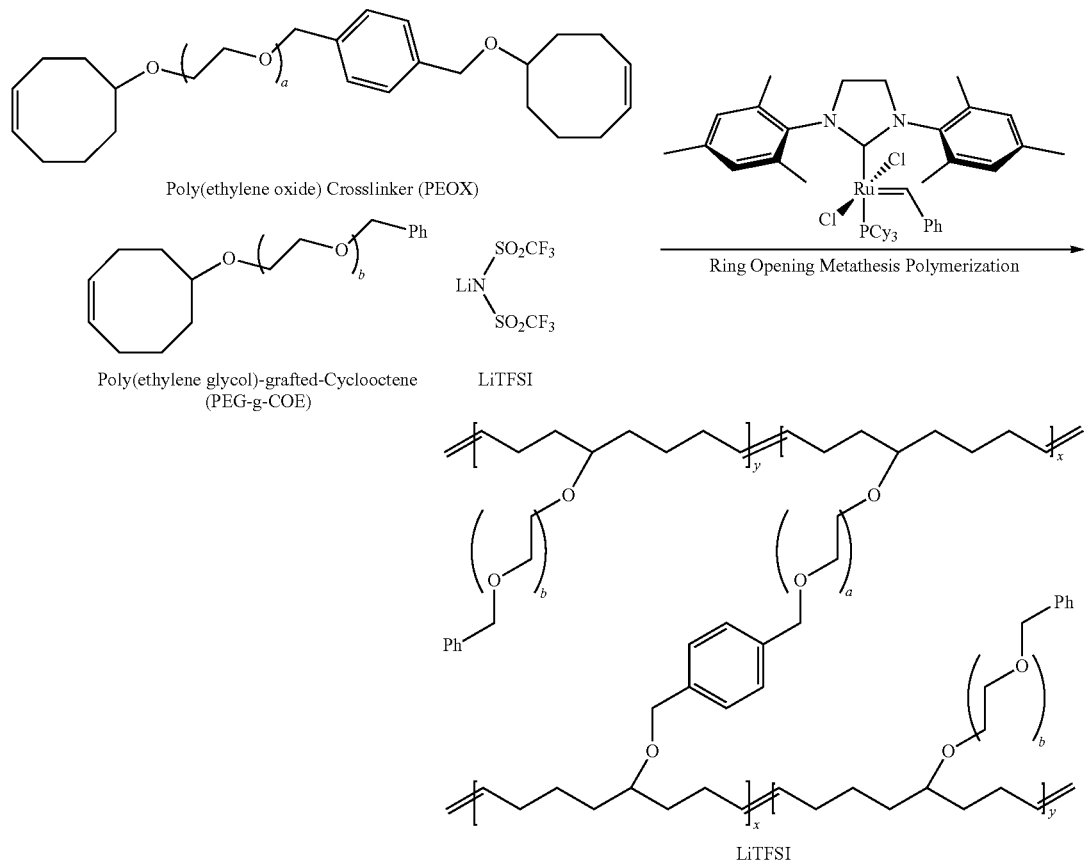

Scheme 4. Sample hydrogenated polynorbornene as the hard segment in the polymer electrolyte
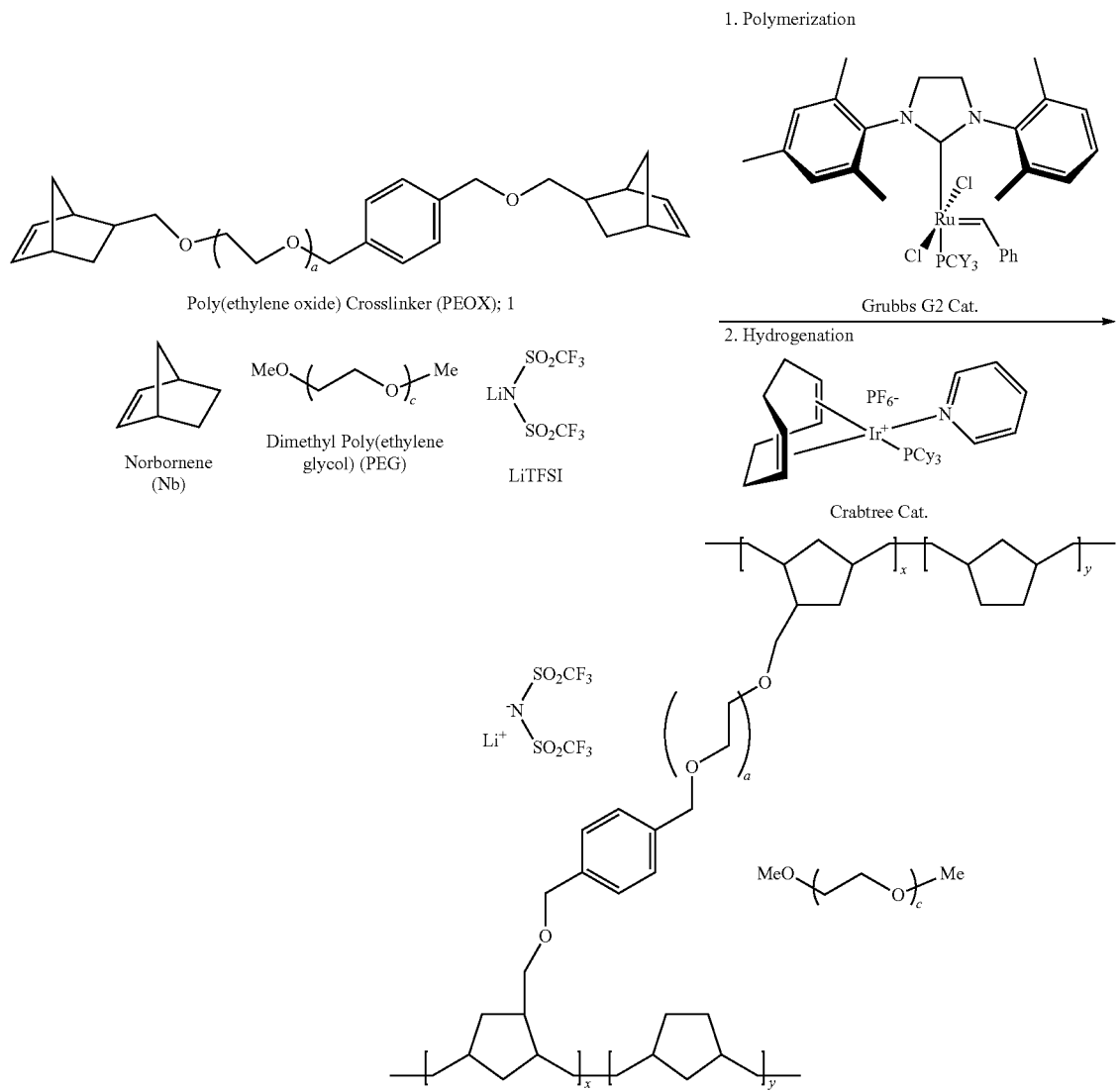
Scheme 5. Sample scheme for the synthesis of unplasticized cross-linked SPE
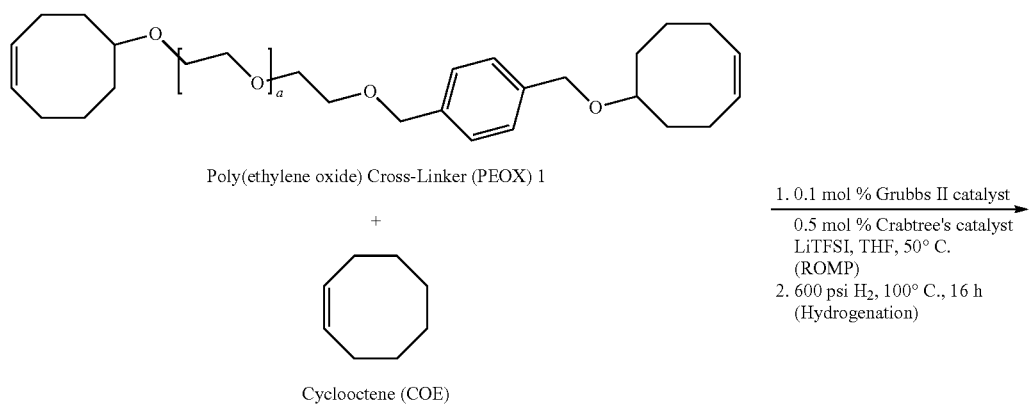

-continued

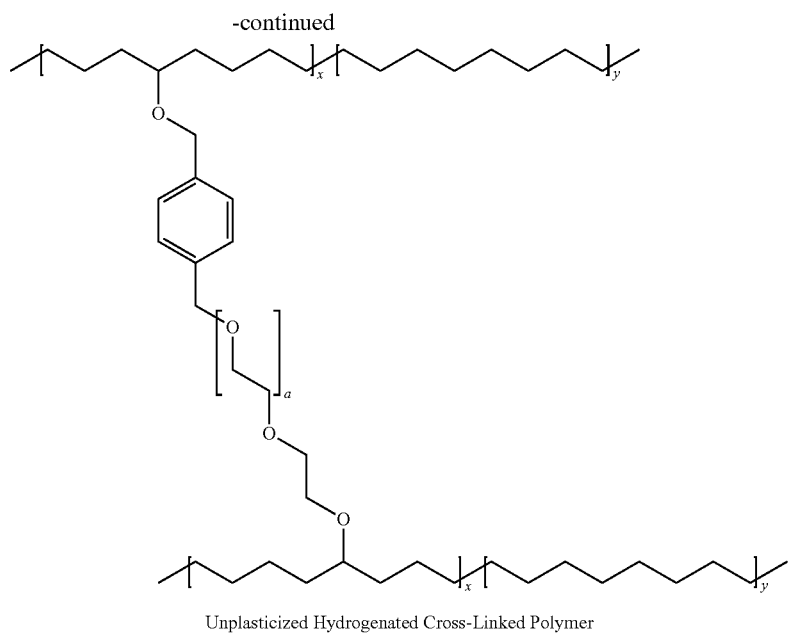

Unplasticized Hydrogenated Cross-Linked Polymer

Synthetic routes according to embodiments of the present invention offer the advantage of, inter alia, tunability of the ionically conductive (e.g., PEO) segment length, which provides precise control of the thermal transitions that affect ionic conductivity.

EXAMPLES

The invention will now be illustrated, but not limited, by reference to the specific embodiments described in the following examples.

Materials

Sodium hydride (95%), 1,5-cyclooctadiene, cis-cyclooctene (95%), meta-chloroperoxybenzoic acid, Grubbs $2^{nd}$ Generation catalyst ($Cl_2$(iMes)($PCy_3$)Ru=CHPh). and Crabtree's catalyst [(COD)Ir(py)($PCy_3$)]$PF_6$ were purchased from Sigma-Aldrich and used as received. Bis(trifluoromethane)sulfonimide lithium salt, LiTFSI (99.95% trace metals basis) was purchased from Sigma-Aldrich and dried in vacuo at 90° C. for 24 h and transferred directly into a glove box. Ethylene oxide was purchased from Sigma-Aldrich and dried over n-BuLi before use. Dimethyl poly(ethylene glycol), PEG275 ($M_n$ (NMR)=275 Da; $M_n$ (Sigma-Aldrich label)=250 Da) was bought from Sigma-Aldrich, dried over activated 3 Å sieves for 48 hours, and degassed by three freeze pump thaw cycles before use. Dibromo-p-xylene (97%) was purchased from Alfa Aesar and used as received. Sodium hydroxide and sodium chloride were purchased from Mallinckrodt and used as received. HPLC grade tetrahydrofuran was purchased from Fischer Scientific and dried over an alumina column and degassed by three freeze pump thaw cycles before use. Chloroform was dried over $P_2O_5$ and distilled prior to use. Hydrogen (99.99%) was purchased from Airgas. $CDCl_3$ was purchased from Cambridge Isotope Laboratories (CIL) and used as received.

Following the procedure described in Hillmyer, M. A.; Laredo, W. R.; Grubbs, R. H. Macromolecules 1995, 28, 6311-6316, 5-hydroxy-1-cyclooctene was prepared, dried over activated 3 Å sieves, and degassed by three freeze pump thaw cycles before use. Potassium naphthalenide in THF was prepared from naphthalene and potassium at a concentration of 0.59 M (titrated with a standard benzoic acid solution until a persistent green color was observed as an end-point of the titration) and degassed by three freeze pump thaw cycles before use.

Scheme S1. General Scheme for the Synthesis of the PEO Functionalized Crosslinker

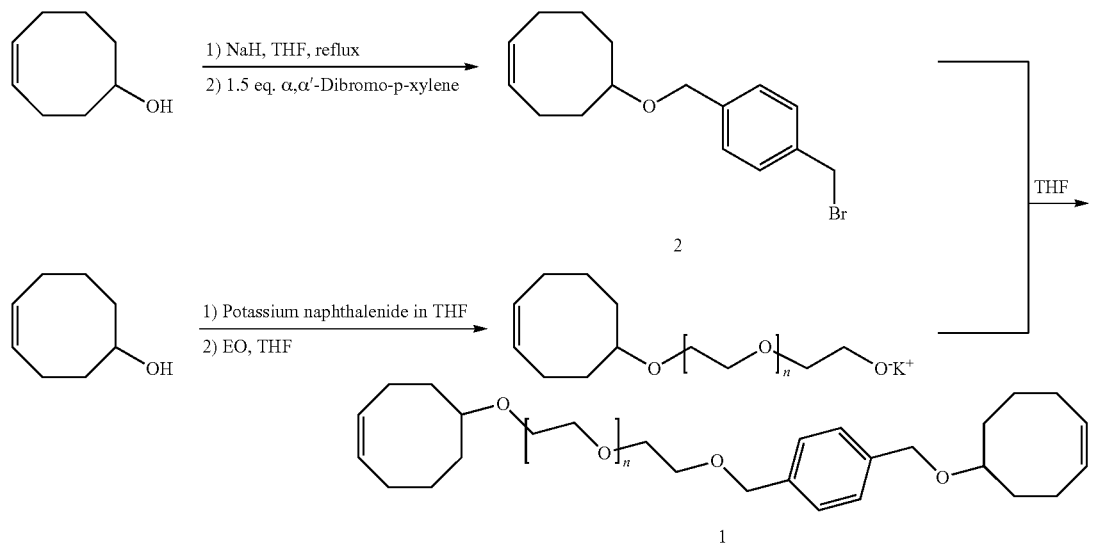

Preparation of (Z)-5-((4-(bromomethyl)benzyl)oxy)cyclooct-1-ene (2): A suspension of NaH (2.65 g, 105 mmol) in anhydrous THF (150 mL) was treated dropwise with 5-hydroxycyclooct-1-ene (8.65 g, 68.5 mmol) and heated to 70° C. under $N_2$ for 16 h. This solution was cooled to room temperature and dropwise cannula transferred to the solution of α,α'-dibromo-p-xylene (27.5 g, 104 mmol) in anhydrous THF (150 mL) at 22° C. under $N_2$, which led to the instantaneous precipitation of salts in a bright yellow solution. The resulting solution was stirred at 22° C. for 16 h and quenched with minimum amount of ethanol until the effervescence ceased. The solution was filtered and the filtrate was concentrated on a rotary evaporator to yield a colorless oil. Hexanes were added (~150 mL) to the crude reaction mixture to recrystallize out excess dibromo-p-xylene. Dibromo-p-xylene was filtered and the filtrate was concentrated on rotary evaporator to yield colorless oil, which was further purified by column chromatography on silica using 1:1 $CH_2Cl_2$/hexanes. The desired product was isolated as colorless oil (7.1 g, 34%).

Preparation of the PEO functionalized crosslinker (1): In a $N_2$ glovebox, a Fischer-Porter bottle was charged with 5-hydroxycyclooct-l-ene (144 mg, 1.14 mmol) solution in THF (2.0 mL). 0.59 M THF solution of potassium naphthalenide (1.9 mL, 1.1 mmol) was added to the alcohol solution dropwise resulting in a dark green solution. The vessel was sealed with the reactor head and the apparatus was removed from the box and stirred at 22° C. for 1 h. The solution was cooled to −78° C. and ethylene oxide (3.58 tz, 81.3 mmol) was then condensed into it. The solution was allowed to warm to room temperature over 16 h. After 16 h, the living alkoxide was capped with 2 (0.43 g, 1.4 mmol), which resulted in immediate precipitation of white KBr salt. The reaction mixture was stirred at 50° C. for 5 h and then allowed to warm to room temperature. The salts formed were filtered over a Celite plug and the filtrate was partially concentrated on rotary evaporator. PEO functionalized crosslinker was then precipitated in ~200 mL hexanes. The resulting white powder (3.3 g, 84%) was dried in vacuum at 30° C. for several hours until its mass was constant.

PEO Functionalized Crosslinker, 1

To study the effect of crosslinker length on the ionic conductivity of the SPE, three crosslinkers of different molecular weights were synthesized using the general procedure described above. The molecular weight and the thermal properties of the crosslinkers are described in Table S1.

TABLE S1

PEO functionalized crosslinker.

| Entry No. | EO units in the crosslinker[a] | $M_n$ (NMR)[a] kg/mol | $M_n$ (GPC)[b] kg/mol | PDI[b] | $T_m$[c] (° C.) | $\Delta H_{fus}$[c] (J/g) |
|---|---|---|---|---|---|---|
| 1 | 33 | 1.8 | 1.3 | 1.1 | 34 | 124.9 |
| 2 | 76 | 3.7 | 3.5 | 1.1 | 47 | 132.4 |
| 3 | 123 | 5.8 | 5.4 | 1.1 | 52 | 153.7 |

[a]Determined by $^1$H NMR spectroscopy.
[b]Determined by THF gel permeation chromatography calibrated with polystyrene standards at 30° C.
[c]Determined by differential scanning calorimetry analysis of the second heat cycle.

Unplasticized Polymer Electrolyte Example Compositions

Ring opening metathesis polymerization (ROMP) was used to develop a PEO based Li-ion conducting polymer electrolyte that could also act as an effective separator in the lithium-battery. The SPE is cross-linked with PEO segments and contains a polyethylene (PE) backbone using an orthogonal-tandem catalysis approach (see Scheme 1, above). Constraining the PEO chains by incorporating them into a crosslinker reduced the crystallinity of PEO in the copolymers. Poly(ethylene oxide) crosslinker, PEOX (1):

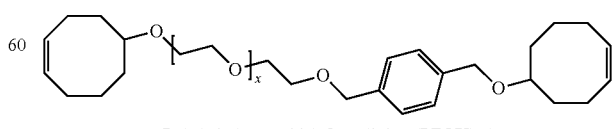

Poly(ethylene oxide) Crosslinker (PEOX); 1 was readily synthesized as described above from inexpensive starting materials in excellent yields. Cyclooctene (COE) was copolymerized with 1 in the presence of Grubbs' second-generation catalyst (G2 catalyst) in THF in a fluoropolymer-lined dish. After slow evaporation of the solvent at 50° C., thin translucent films were obtained. Upon hydrogenation of these unsaturated films catalyzed by the iridium catalyst trapped within the amorphous crosslinked matrix, the mechanical strength of membranes greatly improved, and they were further examined by electrochemical tests.

Some of the SPE embodiments were designed to include controlled fractions of free methoxy-terminated polyethylene glycol (PEG) oligomers as plasticizers to assess their effect on conductivity and mechanical properties of the membranes. A variety of polymer electrolyte samples were prepared by varying the crosslinker length, [COE]:[1] ratio, and weight percentage (wt %) of the plasticizer. To evaluate the effect of crosslinker length on the ionic conductivity of SPEs, three PEOX crosslinkers with 33, 76, and 123 ethylene oxide (EO) repeat units were synthesized (Table 51, above). Nine different SPE embodiments were prepared using three different crosslinkers and at three different [COE]:[1] ratios. The compositions and thermal properties of the SPE embodiments are summarized below in Table 1, where nomenclature corresponds to that described above before the synthetic Schemes; each component in the SPE is given a symbol (e.g. PEOX for the PEO crosslinker), the number of repeat units for each of the components are shown in the superscripts, and the mole fraction of the units in the SPE is given in the subscripts.

cross-linking density of the network polymers, allowing the PEO chains to rearrange and crystallize in the network when enough energy is provided in the heating cycle during DSC.[50] For the SPEs containing 123 EO units ([123]PEOX: entries 7-9), $T_m$s of around 38° C. were observed and the $T_g$s were much higher than those of polymer electrolytes containing 33 and 76 EO units in the crosslinker. Furthermore, among the polymer electrolytes with different crosslinker lengths and the same ratio of [COE]:[1] (e.g. comparison of entries 1, 4, and 7), [33]PEOX polymer electrolytes had the smallest polyethylene (PE) crystallites in the network (lowest $T_m$), which could be explained by the relatively higher cross-linking density in these SPEs that inhibited the PE crystallization in the network. Also, for polymer electrolytes having the same crosslinker length (e.g. entries 1-3), higher [COE]:[1] ratios yielded materials with better mechanical integrity.

The ionic conductivities of the unplasticized SPE embodiments were tested and the values are reported in Table 1. PEOX length had a significant effect on the ionic conductivity of the polymer electrolytes (e.g. comparison of ionic conductivities of entries 1, 4, and 7 at constant [COE]:[1] ratio). However, no substantial changes in ionic conductivities were observed when the number of ethylene repeat units between the cross-links was changed by varying the [COE]:[1] ratio (e.g. comparison of ionic conductivities of [76]PEOX

TABLE 1

Compositions and DC Ionic Conductivities of Unplasticized PE-PEO Cross-Linked SPEs[a]

| entry | unplasticized SPE | [COE]:[1] ratio | PE segments[b] $T_m^d$ (° C.) | PE segments[b] $\Delta H_{fus}^d$ (J/g) | PEO segments[c] $T_g^d$ (° C.) | PEO segments[c] $T_c^d$ (° C.) | PEO segments[c] $T_m^d$ (° C.) | PEO segments[c] $\Delta H_{fus}^d$ (J/g) | DC Ionic conductivity at 25° C.[e] (S/cm) |
|---|---|---|---|---|---|---|---|---|---|
| 1 | ([33]PEOX$_{0.32}$)([34]PE$_{0.68}$) | 15:1 | 89 | 20.0 | −45 | n.d.[f] | n.d.[f] | n.d.[f] | 5.2 × 10⁻⁶ |
| 2 | ([33]PEOX$_{0.40}$)([24]PE$_{0.60}$) | 10:1 | 82 | 14.8 | −45 | n.d.[f] | n.d.[f] | n.d.[f] | 9.0 × 10⁻⁶ |
| 3 | ([33]PEOX$_{0.47}$)([18]PE$_{0.53}$) | 7:1 | 61 | 6.4 | −43 | n.d.[f] | n.d.[f] | n.d.[f] | 8.3 × 10⁻⁶ |
| 4 | ([76]PEOX$_{0.51}$)([34]PE$_{0.49}$) | 15:1 | 94 | 11.8 | −49 | −20 | 23 | 5.4 | 2.3 × 10⁻⁵ |
| 5 | ([76]PEOX$_{0.60}$)([24]PE$_{0.40}$) | 10:1 | 88 | 10.1 | −50 | −19 | 26 | 9.4 | 2.8 × 10⁻⁵ |
| 6 | ([76]PEOX$_{0.66}$)([18]PE$_{0.34}$) | 7:1 | 74 | 2.9 | −48 | −14 | 25 | 5.6 | 3.1 × 10⁻⁵ |
| 7 | ([123]PEOX$_{0.64}$)([34]PE$_{0.36}$) | 15:1 | 111 | 10.1 | −38 | n.d.[f] | 39 | 18.6 | 8.2 × 10⁻⁶ |
| 8 | ([123]PEOX$_{0.72}$)([24]PE$_{0.28}$) | 10:1 | 103 | 1.2 | −39 | n.d.[f] | 37 | 12.6 | 8.4 × 10⁻⁶ |
| 9 | ([123]PEOX$_{0.77}$)([18]PE$_{0.23}$) | 7:1 | 97 | 1.1 | −38 | n.d.[f] | 38 | 16.1 | 7.4 × 10⁻⁶ |

[a]All films had [EO]:[Li] composition of 18:1; where EO means ethylene oxide units in the PEOX cross-linker.
[b]PE segments: polyethylene domains in the polymer electrolyte.
[c]PEO segments: poly(ethylene oxide) domains in the polymer electrolyte.
[d]Glass transition temperature ($T_g$), cold crystallization temperature ($T_c$), and melting temperature ($T_m$) were determined by differential scanning calorimetry of the second heat cycle.
[e]Determined by dielectric spectroscopy measurements. See Supporting Information (SI) for more details.
[f]Not detected.

The SPE embodiments containing the crosslinker with 33 EO units ([33]PEOX: entries 1-3), showed no melting transition ($T_m$) of the PEO segments, indicating that the PEO domains of the cross-linked SPE are essentially amorphous. Electrolytes with 76 EO units in the crosslinker ([76]PEOX: entries 4-6), exhibited glass transition temperatures ($T_g$s) of about −49° C. which are lower than the $T_g$s observed for [33]PEOX SPEs ($T_g$~−44° C.), suggesting moderately enhanced segmental motion of the PEO in [76]PEOX electrolytes. Furthermore, [76]PEOX SPEs exhibited both a cold crystallization temperatures ($T_c$s) and $T_m$s near room temperature in the PEO segments during the heating cycle of the DSC, while no crystallization temperature was observed in the cooling cycle on DSC. This can be attributed to the low electrolytes: entries 4, 5, and 6). Although PEO domains in the [33]PEOX SPEs were completely amorphous (no $T_m$) and [76]PEOX electrolytes had crystalline PEO domains in the network structure, [76]PEOX electrolytes exhibited the highest ionic conductivities of 2.7×10⁻⁵ S/cm, which are roughly three times more than that observed for the [33]PEOX and [123]PEOX electrolytes (<10⁻⁵ S/cm) and more than four times higher than the PEO-LiTFSI (σ of 7.2×10⁻⁶ S/cm at [EO]:[Li] 18:1 and 25° C.). Without being bound to the theory, the surprisingly high ionic conductivity of the [76]PEOX electrolytes may be a direct consequence of the low $T_g$ of these SPEs, allowing enhanced segmental motion of PEO in the amorphous domains thus facilitating lithium-ion conduction. Among the [76]PEOX electrolytes tested, ([76]PEOX$_{0.66}$)([18]PE$_{0.34}$) exhibited maximum ionic conductivity (3.1×10⁻⁵ S/cm at 25° C.).

Polymer Electrolyte Example Compositions Containing a Plasticizer

Varying amounts of poly(ethylene glycol) dimethylether (PEG; $M_n$ 275 Da and flash point 156° C.) (16, 24, 31, and 39 wt %) were added as a plasticizer to the unplasticized ($^{76}$PEOX$_{0.51}$)($^{34}$PE$_{0.49}$) SPE embodiment to obtained plasticized embodiments. Compositions and thermal characteristics of the plasticized samples are reported in Table 2.

of 3 h until a sudden drop in voltage was observed. This large decline in voltage was attributed to the formation of dendrite short.

At a current density of 0.5 mA/cm² and measurement temperature of 90° C. the unplasticized solid polymer electrolyte, ($^{70}$PEOX$_{0.50}$)($^{24}$PE$_{0.50}$) with only a modest shear modulus (G'~10⁵ Pa at 90° C.), displayed an order of magnitude higher $C_d$ value (1185 C/cm² at J=0.50 mA/cm²

TABLE 2

Compositions of Plasticized PE-PEO Cross-Linked SPEs[a]

| | | | PE segments[c] | | PEO segments[d] | | | |
|---|---|---|---|---|---|---|---|---|
| entry | plasticized SPE | weight % plasticizer ($^5$PEG)[b] | $T_m^e$ (° C.) | $\Delta H_{fus}^e$ (J/g) | $T_g^e$ (° C.) | $T_c^e$ (° C.) | $T_m^e$ (° C.) | $\Delta H_{fus}^e$ (J/g) |
| 1[f] | ($^{70}$PEOX$_{0.50}$)($^{34}$PE$_{0.50}$) | 0 | 91 | 15.2 | −47 | −14 | 20 | 10.1 |
| 2[f] | ($^{70}$PEOX$_{0.43}$)($^{34}$PE$_{0.43}$)($^5$PEG$_{0.14}$) | 16 | 91 | 14.8 | −54 | −22 | 15 | 8.3 |
| 3[f] | ($^{70}$PEOX$_{0.39}$)($^{34}$PE$_{0.39}$)($^5$PEG$_{0.22}$) | 24 | 97 | 19.5 | −57 | −22 | 16 | 12.8 |
| 4[f] | ($^{70}$PEOX$_{0.34}$)($^{34}$PE$_{0.35}$)($^5$PEG$_{0.31}$) | 31 | 95 | 20.1 | −61 | −26 | 18 | 14.9 |
| 5[f] | ($^{70}$PEOX$_{0.30}$)($^{34}$PE$_{0.31}$)($^5$PEG$_{0.39}$) | 39 | 96 | 14.8 | −65 | −29 | 14 | 11.6 |
| 6[g] | ($^5$PEG$_{1.00}$) | 75 | n.a.[h] | n.a.[h] | −88 | n.d.[i] | n.d.[i] | n.d.[i] |

[a]All films had [EO]:[Li] composition of 18:1; where EO includes ethylene oxide units contained both in the PEOX cross-linker and PEG plasticizer.
[b]Wt % of PEG plasticizer = [(mass of PEG)/{(mass of PEG) + (mass of PEOX) + (mass of COE) + (mass of LiTFSI)}] × 100.
[c]PE segments: Polyethylene domains in the polymer electrolyte.
[d]PEO segments: Poly(ethylene oxide) domains in the polymer electrolyte.
[e]Glass transition temperature ($T_g$), cold crystallization temperature ($T_c$), and melting temperature ($T_m$) were determined by differential scanning calorimetry of the second heat cycle.
[f]All films had 70 EO units in the cross-linker and [COE]:[1] loading of 15:1.
[g]Sample $^5$PEG$_{1.00}$: dimethyl poly(ethylene glycol), $M_n$ 275 Da with [EO]:[Li] composition of 18:1 for comparison purposes.
[h]Not applicable.
[i]Not detected.

As evident in Table 2, addition of plasticizer led to a significant decrease in $T_g$ from −47° C. (0 wt % PEG) to −65° C. (39 wt % PEG). Also, a significant decrease in the $T_c$ and $T_m$ corresponding to the PEO segments in the plasticized SPE embodiments (entries 1-5) was observed indicating that the PEO crystallization was hindered by incorporating small PEG oligomers into the cross-linked network. The temperature dependent ionic conductivities of these cross-linked plasticized SPEs at various wt % of PEG (16, 24, 31, 39 wt %) are shown in FIG. 1. Notably, SPE with 39 wt % PEG (entry 5) showed an ionic conductivity value of 2.0×10⁻⁴ S/cm, which is an order of magnitude higher than the unplasticized SPE (0 wt % plasticizer; entry 1).

Dendrite Growth Resistance Testing

Galvanostatic lithium plate/strip electrochemical cycling measurements were performed in symmetric Li/SPE/Li cell to quantify the effect of the inventive SPE embodiments on the lifetime of lithium-metal based batteries. Measurements were performed at variable current densities, J, using a three hour lithium plating followed by a three hour lithium stripping routine designed to ensure that in the event of unstable electrodeposition, sufficient quantities of lithium is transported during each cycle to bridge the inter-electrode space and short-circuit the cell. The SPE's resistance to dendrite growth is here quantified in terms of total charge passed, $C_d$, at the time of cell failure by dendrite-induced short-circuits.

Specifically, galvanostatic cycling short-circuit measurements were performed on Li/SPE/Li symmetric coin cells using a Neware CT-3008 battery tester with wiring into (Fisher Scientific and VWR) convection ovens to maintain T=90° C. Repeated three hour charge and three hour discharge cycles were performed at the specified current density value, with no rest periods, following an initial 24 hour period of three hour charge and three hour discharge cycling at a lower current density (10% of the final value). The cells were cycled at constant current density with each half cycle and 90° C.) than reported by Stone, G. M.; Mullin, S. A.; Teran, A. A.; Hallinan, D. T., Jr.; Minor, A. M.; Hexemer, A.; Balsara, N. P. *J Electrochem. Soc.* 2012, 159, A222 for high modulus PS-b-PEO block copolymers (105 C/cm² at J=0.26 mA/cm² and 90° C.). This finding demonstrates that a separator exhibiting high shear storage modulus is not a requirement to inhibit dendrite growth.

One sample, ($^{70}$PEOX$_{0.34}$)($^{34}$PE$_{0.35}$)($^5$PEG$_{0.31}$), a plasticized SPE (31 wt % PEG) with high ionic conductivity ($\sigma$~1.6×10⁻⁴ S/cm at 25° C.) and reasonable storage modulus (G'~1.0×10⁵ Pa at 90° C.), was selected to measure $C_d$ at variable current densities (0.26 mA/cm²-1.0 mA/cm²) and 90° C.

Figure 2A:
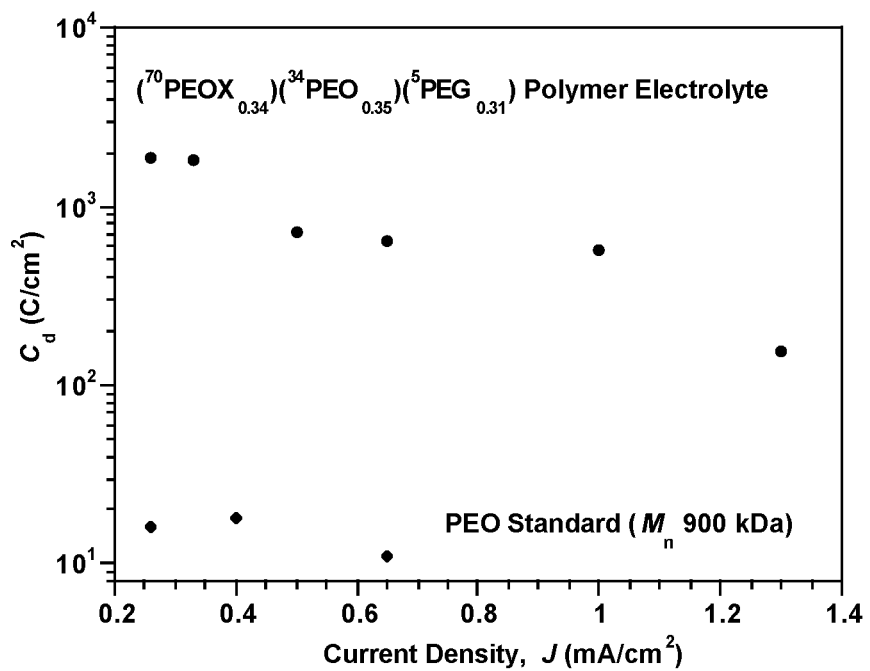
FIGS. 2A and 2B provide dendrite test results for polymer electrolyte composition embodiments.

FIG. 2A reports $C_d$ values as a function of current density for a high molar mass PEO standard ($M_n$ 900 kDa) and ($^{70}$PEOX$_{0.34}$)($^{34}$PE$_{0.35}$)($^5$PEG$_{0.31}$). The PE-PEO cross-linked SPE embodiment displayed significantly higher Ca values than observed for PEO ($M_n$ 900 kDa) sample at all the measured current density values. Notably, it displayed a $C_d$ value of 1790 C/cm² that is more than an order of magnitude greater than reported for PS-b-PEO block copolymers ($C_d$ value of 105 C/cm²) under the same testing conditions (0.26 mA/cm² and 90° C.). At higher current density values (>0.26 mA/cm²), the cells short-circuit faster and $C_d$ values are consequently lower. Significantly, even under these harsher measurement conditions (cells cycled at significantly higher current density), the PE-PEO cross-linked SPE displayed a higher $C_d$ value (156 C/cm² at J=1.30 mA/cm² and 90° C.) compared to PS-b-PEO block copolymer (105 C/cm² at J=0.26 mA/cm² and 90° C.). Recently, Balsara and coworkers reported TiO$_2$-doped PS-b-PEO block copolymer, that showed better dendrite growth suppression than the PS-b-PEO block copolymers ($C_d$ value of 1766 C/cm² compared to 374 C/cm² at 0.17 mA/cm² and 90° C.). Gurevitch, I.; Buonsanti, R.; Teran, A. A.; Gludovatz, B.; Ritchie, R. O.; Cabana, J.; Balsara, N. P. *J. Electrochem. Soc.* 2013, 160, A1611-A1617.

To further demonstrate the application of the PE-PEO cross-linked SPE embodiments at lower temperatures, galvanostatic cycling tests were also performed at 55° C. The ($^{70}$PEOX$_{0.34}$)($^{34}$PE$_{0.35}$)($^{5}$PEG$_{0.31}$) polymer electrolyte exhibited C$_d$ values of 564 C/cm$^2$ and 544 C/cm$^2$ at 0.40 mA/cm$^2$ and 0.65 mA/cm$^2$, respectively. These results are of significant interest because the high C$_d$ values of these SPEs indicate their ability to inhibit dendrite growth, and the high ionic conductivity value of 7.0×10$^{-4}$ S/cm at 55° C. supports their application for moderate temperature Li-metal battery operation.

Figure 2B:
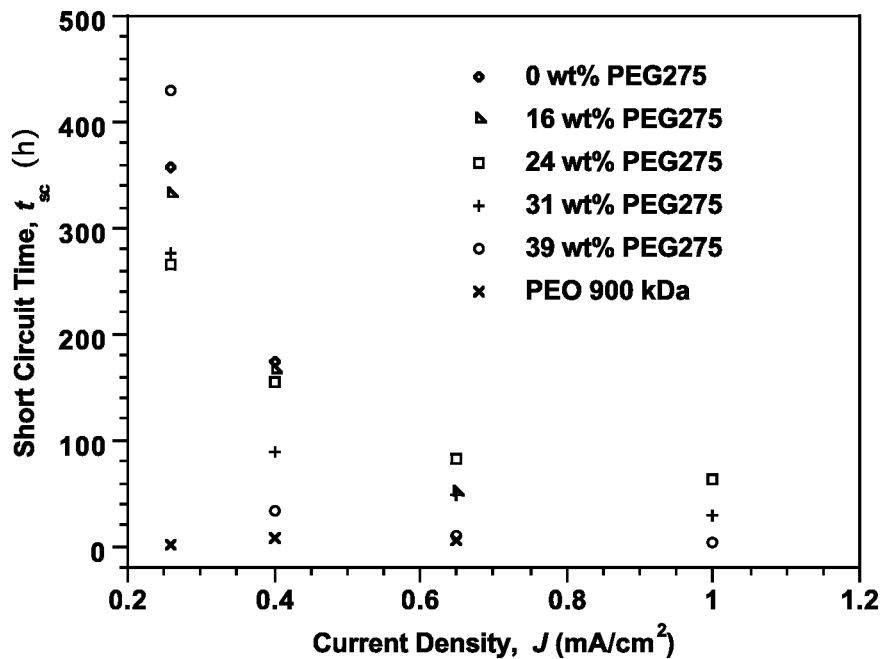

Dendrite resistance of selected SPEs was also examined using more conventional, but much harsher galvanostatic polarization conditions. In this approach the voltage response in a symmetric Li/SPE/Li cell is studied during continuous one direction plating at a prescribed current density. In these measurements, the Li/SPE/Li symmetric cells were polarized at current densities in the range 0.26-1.0 mA/cm$^2$ at 90° C. until the voltage drop was observed. Cells galvanostatically polarized at current densities of less than or equal to 0.26 mA/cm$^2$ were able to plate the entire Li electrode without short circuit; in these cases, divergence of the potential halted testing. This finding means that a lithium battery operated under these conditions would not fail by dendrite-induced short circuits. To characterize the short circuit times (t$_{sc}$) at 0.26 mA/cm$^2$, it was necessary to laminate multiple Li foil layers (thickness ~800 μm) to increase the amount of source Li in the electrode being stripped. FIG. 2B shows the variation of the measured cell short circuit time, t$_{sc}$, with current density (0.26 mA/cm$^2$-1.0 mA/cm$^2$) for the cross-linked SPEs at 90° C. Duplicate measurements were performed for two cross-linked samples at a specified current density value and the results were found to be within 5% error. Since the tests were time consuming, we performed only single measurements for rest of the cross-linked SPEs and the results are shown in FIG. 2B. To the best of Applicant's knowledge, the short circuit times of the SPEs (Table 2, entries 1-5) are significantly higher than all other reported SPE's to date.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), "contain" (and any form contain, such as "contains" and "containing"), and any other grammatical variant thereof, are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

As used herein, the terms "comprising," "has," "including," "containing," and other grammatical variants thereof encompass the terms "consisting of" and "consisting essentially of."

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

All publications cited in this specification are herein incorporated by reference as if each individual publication were specifically and individually indicated to be incorporated by reference herein as though fully set forth.

Subject matter incorporated by reference is not considered to be an alternative to any claim limitations, unless otherwise explicitly indicated.

Where one or more ranges are referred to throughout this specification, each range is intended to be a shorthand format for presenting information, where the range is understood to encompass each discrete point within the range as if the same were fully set forth herein.

While several aspects and embodiments of the present invention have been described and depicted herein, alternative aspects and embodiments may be affected by those skilled in the art to accomplish the same objectives. Accordingly, this disclosure and the appended claims are intended to cover all such further and alternative aspects and embodiments as fall within the true spirit and scope of the invention.

The invention claimed is:

1. A polymer electrolyte composition comprising:
   a plurality of hard polymer segments having:
   (a) a glass transition temperature (T$_g$) greater than or equal to 110° C.; or
   (b) a melting temperature (T$_m$) greater than 110° C.;
   an ionically-conducting segment, said ionically-conducting segment having a molecular weight of 800 to 10,000 g/mol; and
   a salt comprising an element M, wherein M is selected from an alkali metal, an alkaline earth metal, zinc, and aluminum,
   wherein:
   at least one of the hard polymer segments is covalently bound to the ionically-conducting segment;
   the ionically-conducting segment comprises a structural unit having the formula:

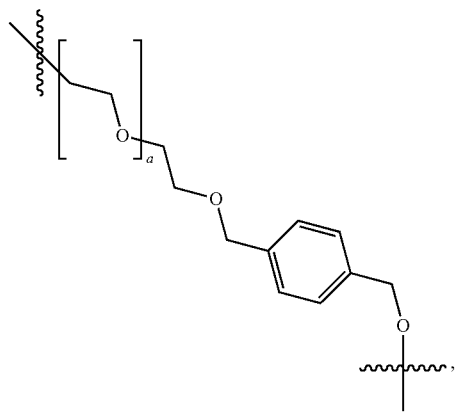

wherein a represents a number from 40 to 130; and
   said polymer electrolyte composition has an ionic conductivity for an M ion greater than or equal to 1×10$^{-8}$ S/cm at 25° C.

2. The polymer electrolyte composition according to claim 1, said polymer electrolyte composition having an ionic conductivity for M ion greater than 1×10$^{-5}$ S/cm at 25° C.

3. The polymer electrolyte composition according to claim 1, further comprising a plasticizer.

4. The polymer electrolyte composition according to claim 3, wherein the plasticizer comprises polyethylene glycol dimethyl ether.

5. The polymer electrolyte composition according to claim 1, wherein M is selected from an alkali metal and an alkaline earth metal.

6. The polymer electrolyte composition according to claim 1, wherein at least one of the hard polymer segment comprises a $C_{15}$ to $C_{80}$ alkyl group.

7. The polymer electrolyte composition according to claim 1, wherein at least one of the hard polymer segments comprises polyethylene.

8. The polymer electrolyte composition according to claim 1, wherein a represents a number from 70 to 90.

9. The polymer electrolyte composition according to claim 1, wherein the ionically-conducting segment comprises a residue from a precursor compound of the formula (I):

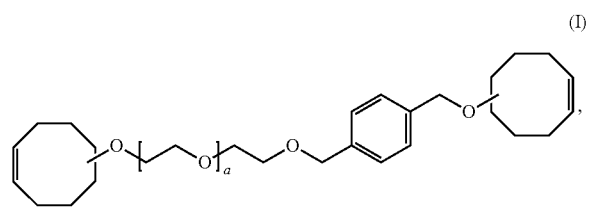

wherein a represents a number from 40 to 130.

10. The polymer electrolyte composition according to claim 1, wherein:
M is lithium;
said polymer electrolyte composition has an ionic conductivity for $Li^+$ greater than or equal to $1 \times 10^{-6}$ S/cm at 25° C.; and
said polymer electrolyte composition has a lithium dendrite growth resistance ($C_d$) value greater than or equal to 1000 C/cm² at current density (J) value of 0.26 mA/cm² and 90° C.

11. The polymer electrolyte composition according to claim 10, wherein a represents a number from 70 to 90.

12. The polymer electrolyte composition according to claim 1, wherein:
at least one of the hard polymer segments comprises polyethylene; and
the salt is a lithium salt.

13. The polymer electrolyte composition according to claim 12, wherein a represents a number from 70 to 90.

14. The polymer electrolyte composition according to claim 12, wherein the ionically-conducting segment comprises a residue from a precursor compound of the formula (I):

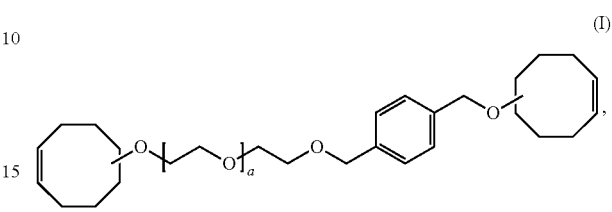

wherein a represents a number from 40 to 130.

15. The polymer electrolyte composition according to claim 12, wherein the lithium salt is selected from the group consisting of lithium bis(trifluoromethanesulfonyl)imide (LiTF SI), lithium hexafluorophosphate ($LiPF_6$), lithium trifluoromethanesulfonate ($LiCF_3SO3$), lithium perchlorate ($LiClO_4$), lithium tetrafluoroborate ($LiBF_4$), lithium hexafluoroarsenate ($LiAsF_6$), lithium bis(trifluoromethanesulfonimide) ($LiN(CF_3SO_2)_2$), lithium bis(perfluoroethylsulfonylimide) ($LiN(C_2F_5SO_2)_2$), lithium thiocyanate (Li SCN), lithium dicyanamide ($LiN(CN)_2$), lithium tris (trifluoromethanesulphonyl)methyl ($LiC(CF_3SO_2)_3$), lithium bisoxalatoborate ($LiB(C_2O_4)_2$), lithium oxalatoborates, lithium bis(chelato)borate, lithium alkyl fluorophosphates, $LiPF_3(C_2F_5)_3$, and $LiPF_3(CF_3)_3$.

16. The polymer electrolyte composition according to claim 15, wherein the lithium salt is LiTFSI.

17. An electrochemical cell comprising a separator, said separator comprising the polymer electrolyte composition according to claim 1.

18. An energy storage device comprising a plurality of electrochemical cells, wherein at least one of the plurality of electrochemical cells is an electrochemical cell according to claim 17.

19. The polymer electrolyte composition according to claim 1, having a polymer framework that is crosslinked, wherein at least two hard polymer segments are covalently bound to the ionically-conducting segment.

* * * * *